INVENTORS
GEORGE J. LAURER
CARL D. SOUTHARD
BY Donald F Voss
ATTORNEY

United States Patent Office 2,963,685

Patented Dec. 6, 1960

2,963,685

DATA STORAGE APPARATUS AND CONTROLS THEREFOR

George J. Laurer, Johnson City, and Carl D. Southard, Endwell, N.Y., assignors to International Business Machines Corporation, New York, N.Y., a corporation of New York Filed Sept. 14, 1959, Ser. No. 839,775

8 Claims. (Cl. 340—166)

This invention relates to data storage apparatus and, more particularly, to electronic data storage and readout apparatus.

In many instances, for electronic data processing apparatus, it is desirable to have the facility of interim or buffer data storage to enable transfer of data to and from data input, output, and processing devices. The buffer data storage permits rearrangement or editing of data whereby data may be read into storage in one sequence and read out in another. Often, the buffer data storage apparatus is situated between a data input source and a more permanent type of data storage. The buffer storage apparatus usually has a substantially large number of data storage positions which may be read out to a lesser number of output devices or to the recording devices for recording the data in the more permanent type of data storage.

Heretofore, there has been a definite lack of an economical arrangement of apparatus to facilitate the readout of data from a large number of data storage positions to a substantially fewer number of output devices. This is particularly true where extreme flexibility is required, such as random entry of data into the storage device, but where the data is subsequently read out sequentially in groups.

The present invention utilizes electronic elements, such as gas triodes or thyratrons, for storing bits of data. If data is stored, the thyratron is conducting, otherwise, it is in the nonconductive state. The thyratrons each may be thought of as one storage position. However, the data stored by the thyratron may be representing the presence of data in a particular row and column of the source record. Hence, each thyratron has one input for line information and one input for column information. If coincident inputs occur, the thyratron will conduct and data, consequently, is stored therein. In this manner, data is entered into buffer storage. Through the facility of plugboard arrangements, data at any row and column position may be entered into any one of the thyratrons. Once the data is read in at a particular pattern, it is read out in a fixed sequence. Hence, all editing or arranging of data is during the read-in of data to the buffer storage unit.

While data may be read into the storage elements, or thyratrons in parallel fashion, the data is read out therefrom serially. In essence, the output conductors from the plates of the thyratrons are each connected as a pedestal drive for an associated clamped positive logical OR circuit having its output A.C. coupled to an inverter follower latch. In reading information from buffer storage, the anode return potential of the individual thyratrons is elevated in succession while the latch output is time sampled in synchronism with the impulses applied to sequentially increase the anode potential of the thyratrons. The latch is reset in a timed sequence so as to be in the "on" state at the time that the plate potential of any of the associated thyratrons is elevated. By this arrangement, if the thyratron having its plate potential elevated is conducting, the latch remains in the "on" state; otherwise, the latch is switched to its "off" state. Hence, by time sampling the latch, the output device connected to the latch will receive a signal only when a bit of information is stored in the thyratron having its plate potential elevated.

Accordingly, a prime object of the invention is to provide an improved arrangement of data storage apparatus having a substantially large number of data storage positions from which data may be read out sequentially to a fewer number of output or utilization devices.

Another very important object of the invention is to provide an improved arrangement of data storage apparatus having a substantially large number of data storage positions including an economical arrangement of apparatus to facilitate the readout of data from any of the data storage positions to a fewer number of output devices.

Still another object of the invention is to provide an improved arrangement of data storage apparatus which enables the selective entry of data into storage at one time and the readout thereof in groups of data at another time.

The foregoing and other objects, features and advantages of the invention will be apparent from the following more particular description of a preferred embodiment of the invention, as illustrated in the accompanying drawings.

Figure 1:
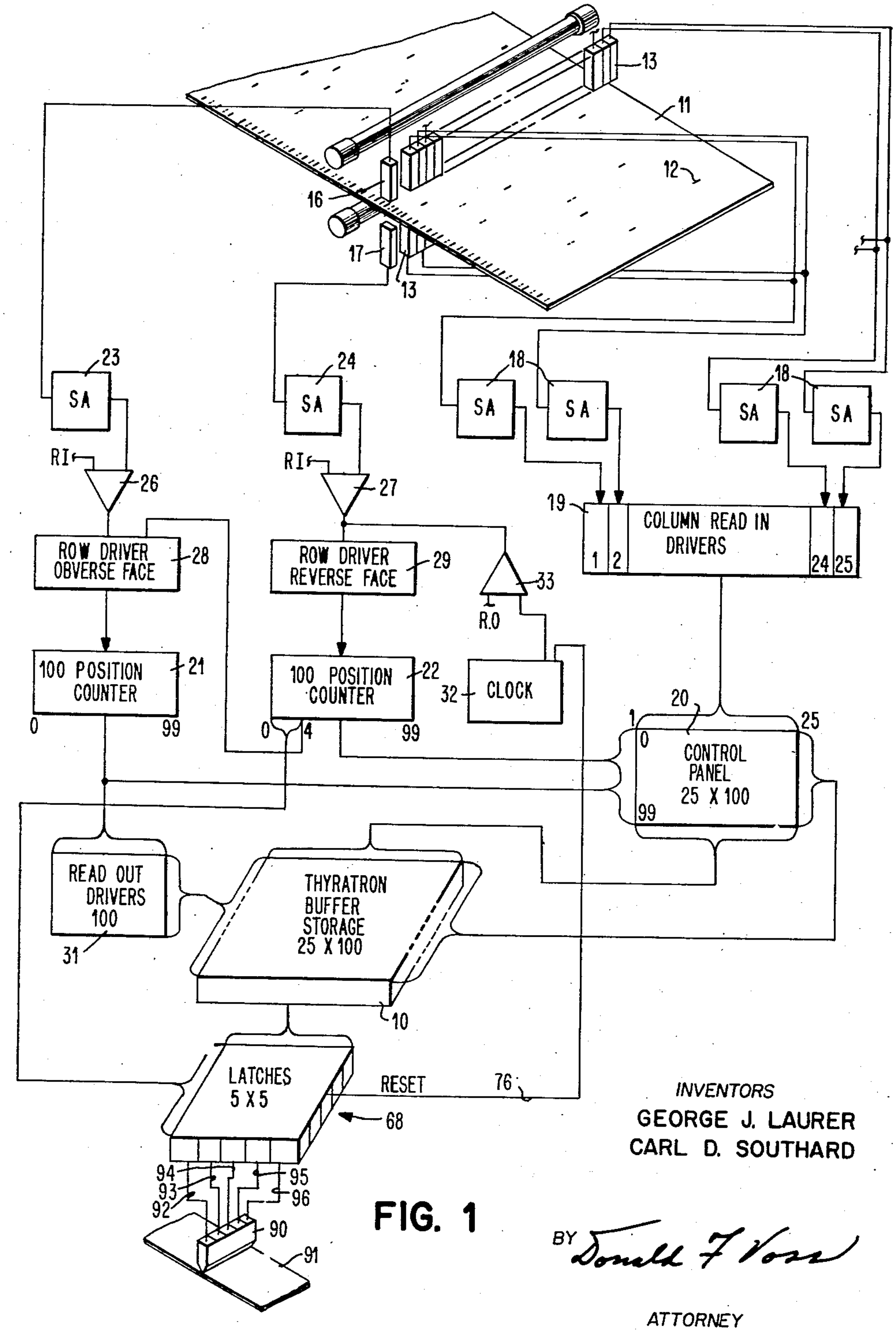
Fig. 1 is a schematic diagram showing an arrangement of apparatus for read-in data sensed from a record to the buffer storage unit in a predetermined pattern and for the subsequent readout of data therefrom sequentially in groups to recording devices for recording the data on magnetic tape.

With reference to the drawings and particularly to Fig. 1, the invention is illustrated schematically by way of example as a data buffer storage unit 10 for storing data derived from records 11. The records 11 contain data on both the obverse and reverse faces. The information on the records 11 lies at discrete row and column positions and is in the form of marks 12 which are sensed photoelectrically. In this example, the information relates to answers to questions asked during a census-taking operation. Hence, the answers to the questions will be in the form of marks made to indicate yes, no, some number, etc. These marks 12 are sensed by pohtoelectric sensing elements 13 aligned with the column positions on both sides of the faces of the records. Row position information is derived from row indicating marks 14 disposed on the margins of both faces of the records 11. The indicating marks 14 on one face of the record 11 alternates with the indicating marks on the opposite face. These indicating marks 14 are also sensed photoelectrically by photoelectric sensing elements 16 and 17.

In this example, the records 11 each have 25 columns and 100 rows. However, the records 11 are so comprised that data is not recorded at each column position for each row. The maximum amount of data contained by the records 11 on both faces thereof is limited to 2500 data positions. Hence, the buffer storage unit 10 has 2500 data storage positions to accommodate the information contained upon the records 11.

There are 25 sensing elements 13 disposed adjacent both the obverse and reverse faces of the records 11. Each pair of oppositely disposed sensing elements 13 is connected to a corresponding sense amplifier 18 which is, in turn, connected to a column read-in driver 19. The column read-in drivers 19 are connected to a control panel 20. The control panel 20 is of the conventional type employing plug wires for making selective connections between the input and output terminals of the control panel. The control panel 20 also has input terminals connected to positions of counters 21 and 22 which are alternately advanced as a result of the sensing of the indicating marks 14.

The counters 21 and 22 are of the electronic type and each have 100 positions which are to be advanced position by position by impulses generated as the sensing elements 16 and 17 sense the row indicating marks 14. The necessity for the two counters 21 and 22 comes from the fact that the indicating marks 14 on the obverse face of the records alternate with those on the reverse face. Therefore, the two counters 21 and 22 eliminate the need for very accurate line registration of the indicating marks 14. Furthermore, the counters have 100 positions for a purpose which will become more clear during the description of the buffer storage unit.

The outputs of the sensing elements 16 and 17 are connected to the inputs of sense amplifiers 23 and 24, respectively. The outputs of the sense amplifiers 23 and 24 are connected as inputs to logical AND circuits 26 and 27, also having inputs from read-in gates, not shown. The outputs of the logical AND circuits 26 and 27 are connected to row drivers 28 and 29 connected to drive the counters 21 and 22.

The counters 21 and 22 have particular functions during the read-in and readout of data to and from the buffer storage unit 10. Read-in of data does not occur simultaneously with readout of data. However, the read-in and readout of data both occur cyclically. The read-in of data takes up a greater part of one cycle than does the readout of data. The read-in of data is accomplished during approximately a little more than two-thirds of a cycle, while readout takes place in less than one-third of the remaining portion of the cycle. Gates are developed for both the read-in and readout of data. These gates, not shown, are of the conventional type.

The records 11 are scanned row by row and, therefore, during a read-in of data to the buffer storage unit 10, the counters 21 and 22, in effect, provide an indication as to which row of the record 11 is being sensed. Of course, if there isn't any column information associated with the particular row being sensed, no data will be entered into the buffer storage unit 10. Because of this, it is not necessary to control or interrupt the connections between the counters 21 and 22 and the plugboard 20 during the readout of data from the buffer storage unit 10. During readout of data from the buffer storage unit 10, counter 21 is advanced position by position by the counter 22 and each position of the counter 21 is connected to a corresponding readout driver 31, the function of which will be explained later herein.

The counter 22, during the readout of data from the buffer storage unit 10, is advanaced by impulses coming from a clock 32. The output of the clock 32 is connected as an input to a logical AND circuit 33 also having an input from a readout gate, not shown. The output of the logical AND circuit 33 is connected to the row driver 29. The logical AND circuit 33 permits impulses to pass from the clock 32 to the row driver 29 only when the readout gate is up; this arrangement being quite similar to that for the read-in of data, where the logical AND circuits 26 and 27 permit impulses from the sense amplifiers 23 and 24 to pass to the row drivers 28 and 29 only when the read-in gate is up.

The readout gate also functions to close a switch, not shown, to complete a carry circuit, also not shown, from the fifth position of the counter 22 to the reset line of the counter 22 and to the row driver 28 to advance the counter 21. Hence, during readout, the counter 22 advances through its first five positions, and develops a carry which is utilized to impulse the counter 21 and to reset the counter 22 for repeat operations, which take place so long as the readout gate is up. The carry from the counter 22 is applied to the row driver 28 so as to advance the counter 21 one position for each carry. Hence the counter 22 steps through five positions for each position of the counter 21. The readout gate is up for a sufficient period of time to permit the counter 21 to advance through all of its 100 positions. As the counter 21 advances position by position, it sequentially effects the readout of groups of information, or data, to latches 68. The latches 68 are time sampled in groups as the counter 22 advances through its first five positions. The groups of latches 68 are connected to the utilization devices. Hence, the particular reason for stepping the counter 21 one position while the counter 22 steps through five positions during readout is to transfer data by a large group or unit from the buffer storage unit 10 to the latches 68 and subsequently transfer data sequentially in smaller groups from the latches 68 to the utilization devices which, in this example, are magnetic heads 90 for recording data in coded form upon magnetic tape 91.

Before going into further detail with respect to the readout of data from the buffer storage unit 10, the unit itself will be described. The buffer storage unit 10, schematically shown in Fig. 1, is shown in more detail in Fig. 2, and consists of a plurality of thyratrons 50, there being a thyratron for each storage position. In this example, the buffer storage unit 10 is a matrix of 2500 thyratrons arranged in 100 rows with 25 thyratrons in each row.

The thyratrons 50 are of the conventional type having a cathode 51, plate 52, control grid 53 and shield grid 54. In order for the thyratron 50 to conduct, positive signals must be simultaneously applied to both the control and shield grids 53 and 54, respectively. Row information is applied to the shield grids 54 while column information is applied to the control grids 53. This is facilitated by connections, not shown, from the control panel 20. The plates 52 of each of the 25 thyratrons in one row of the 100 rows are connected through plate load resistors 56 to a common drive line 57. The drive lines 57, there being a total of 100, are each connected to a corresponding driver 31, schematically shown in Fig. 1 and shown in more detail in Fig. 2.

The drivers 31 only function during readout of data from the buffer storage unit 10. Hence, during the read-in of data to the buffer storage unit 10, the plates 52 of the thyratrons 50 are connected to +70 volts through diodes 55 which are connected to associated common drive lines 57. There are 100 drivers 31, one driver for each row of 25 thyratrons. The drivers 31 each consist of a cathode follower 40 having the output from its cathode 41 connected to an associated common drive line 57. The grid 42 of the cathode follower 40 is connected to the output of a corresponding position of the counter 21. Hence, in this example, for readout purposes, it is necessary for at least one of the counters to have 100 positions. The drivers 31 are not driven by the counter 21 during read-in of data to the buffer storage unit 10 because a cam-operated contact 43 interrupts a circuit from the +250 volt supply to the anodes 44 of the cathode follower 40. However, during readout, the cam-operated contact 43 is closed to connect the anodes 44 to the +250 volt supply. By this arrangement, the plates 52 of the thyratrons 50 are at approximately +70 volts during read-in and are sequentially raised or elevated in groups of 25 as the counter 21 steps through its 100 positions during readout to the output level of the corresponding cathode followers 40, which is approximately +130 volts, or nearly twice the voltage during read-in.

Figure 4:
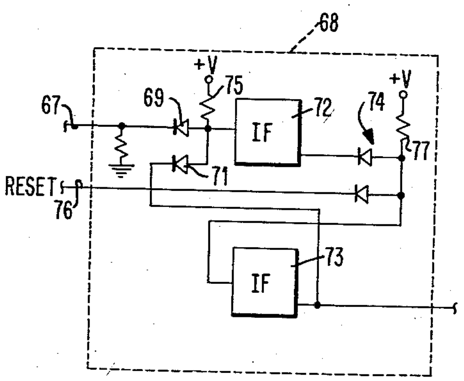
Fig. 4 is a schematic diagram showing the details of the latches.

For readout purposes, the plate 52 of each liked-positioned thyratron 50 in the 100 rows of thyratrons is connected to a bus conductor 58 through a diode 59 having its anode connected to the plate of the associated thyratron 50. The diodes 59, in effect, form a logical OR circuit. Hence, there being 25 like-positions, there are 25 logical OR circuits and 25 bus conductors 58. Each of the 25 bus conductors is connected through a capacitor 61 to the grid 62 of an inverter 63 biased through a grid resistor 64 to be normally nonconductive. Each bus conductor 58 is also connected to the cathode of a diode 65 having its anode returned to +70 volts. Hence, the diodes 65 hold the inputs to the capacitors 61 at a potential level not less than the potential level of the anodes of the diodes 59. The diodes 65 essentially act to clamp the logical OR circuits formed by the diodes 59 at a fixed potential. A resistor 66 is connected to each bus conductor 58 so as to provide a discharge path for the associated capacitor 61. The output or plate of each inverter 63 is connected by conductor 67 to the input of a latch 68, shown in detail in Fig. 4, through a diode 69 connected in parallel with a diode 71, the latch 68 further comprising a pair of inverter followers 72 and 73 coupled by means of a logical AND circuit 74. The diodes 69 and 71, together with pull up resistor 75, also form a logical AND circuit. In order to provide a latch back circuit, the output of the latch 68, taken from the inverter follower 73, is connected to the input of the latch 68 or the inverter follower 72 through the diode 71.

Figure 3:
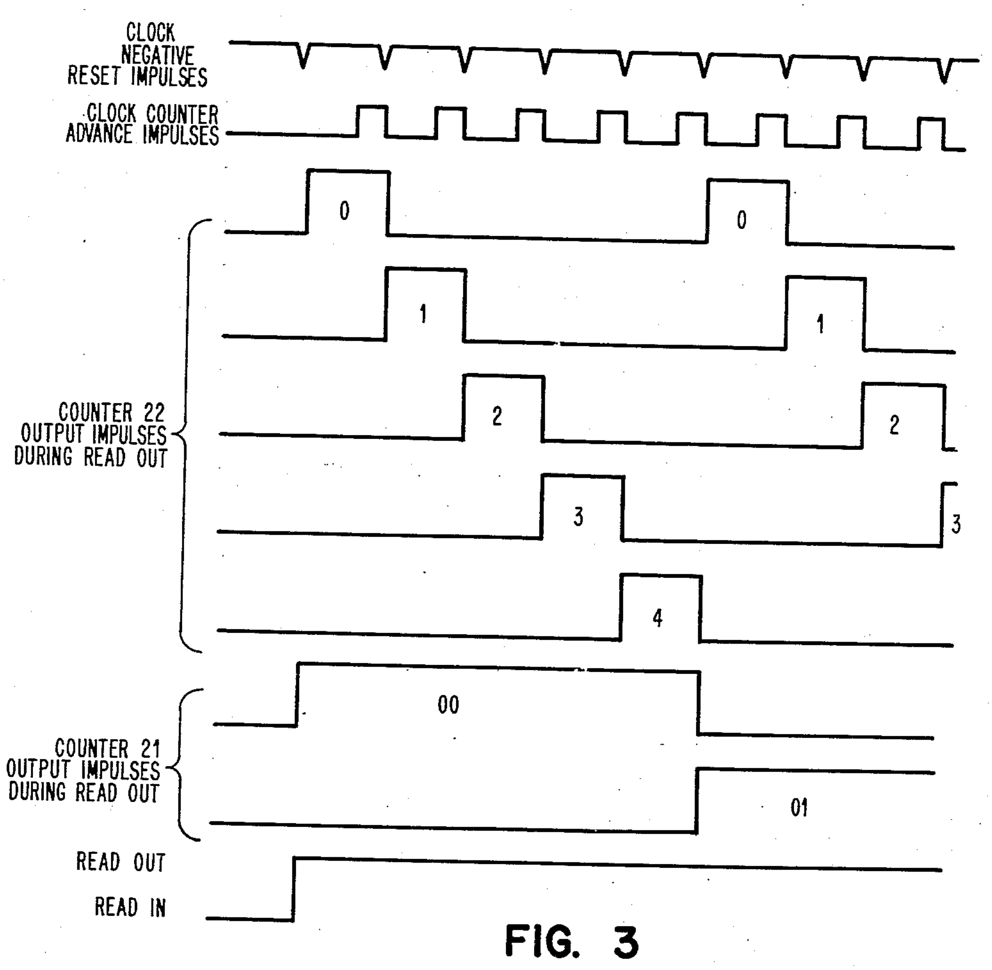
Fig. 3 is a waveform diagram.

The logical AND circuit 74, connected to couple the inverter followers 72 and 73 of the latch 68, has two inputs and one output. One of the inputs is connected to the output of the inverter follower 72 while the other input is connected to a reset conductor 76. The reset conductor 76 also connects to an output of the clock 32, Fig. 1. The clock 32 develops reset impulses, as shown in Fig. 3, for resetting the latches 68. The output of the logical AND circuit 74 is connected to a pull up resistor 77 and to the input of the inverter follower 73. When the inputs to the logical AND circuit are both in a positive direction, the output thereof is also in a positive direction and the latch is set "on." Of course, in this condition, the output of the inverter follower 73, consequently the output of the latch 68, also is positive. Hence, to reset the latch, a negative-going signal is applied to the reset conductor 76 from the clock 32. After the latch is reset, the negative-going signal goes positive and thus conditions the latch to accept the next pulse from the buffer storage unit 10.

Figure 2:
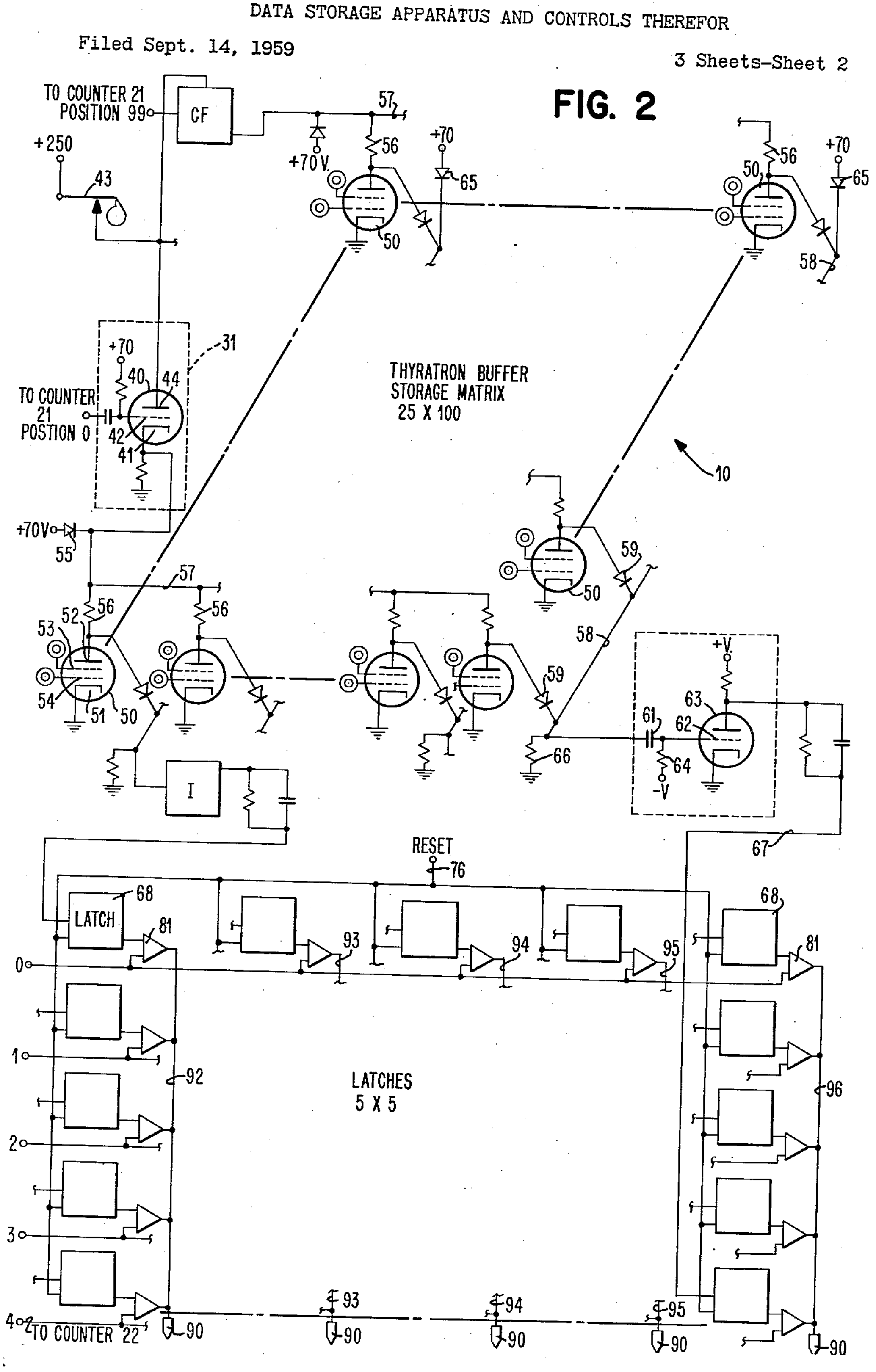
Fig. 2 is a schematic diagram showing the elements of the buffer storage unit, the readout devices, drivers, the latches into which the data is read, and the means for time sampling the latches to enable the passage of data from the latches to the recording devices in a predetermined sequence.

There are 25 latches 68, which are arranged as shown in Figs. 1 and 2 to be read out in groups of five to the magnetic recording heads 90 for recording the data in the form of magnetized spots on the magnetic tape 91. In order that the latches may be read out in groups of five, the output of each latch 68 is connected as input to a logical AND circuit 81. The logical AND circuits 81 for a group of five latches have a common input connected to a corresponding position of counter 22. Since there are 25 latches and these 25 latches are read out in groups of five, the logical AND circuits 81 for the first group of latches will be connected to the output of the zero position of counter 22; the logical AND circuits for the second group of latches will have an input from the output of the second position of counter 22 and so on for the remaining groups of latches. The outputs from the logical AND circuits 81 are connected in groups of five by lines 92, 93, 94, 95 and 96 to the magnetic recording heads 90 for recording data in the form of magnetized spots upon the magnetizable surface of the magnetic tape 91. The magnetic tape, being a more permanent type of record which may be sensed at relatively high speeds, then serves as a record source input to units for processing the data derived therefrom.

It is seen that the counters 21 and 22, which are utilized during read-in of data to the buffer storage unit 10 to provide row data, are also utilized to effect the readout of data, but are utilized in a slightly different manner. Counter 21, during readout, sequentially drives the readout drivers 31. The counter 21 is sequentially driven by the carry coming from counter 22. Hence, the counter 21 serves to transfer data stored in 25 thyratrons to the 25 latches 68. These 25 latches 68 are then time sampled in groups of five by impulses coming from the counter 22. After all of the five groups of latches are sampled as a result of counter 22 stepping through its first five positions, the counter 21 is advanced by the carry so as to impulse the readout drivers 31, which will then effect a transfer of data from a second group of 25 thyratrons to the 25 latches 68, which are again sampled in groups of five for five times to read out the information therefrom. This operation continues untill all 100 rows of thyratrons, 25 in each row, are read out to the latches 68.

The information is thus read out from the buffer storage unit from 25 thyratrons at a time. The information represented in each group of 25 thyratrons is transferred to the 25 latches, which are scanned five at one time. The latches are reset by the negative-going impulses coming from the clock 32 so as to permit continuous operation. The data recorded upon the magnetic tape 91 by the magnetic heads 90 is actually recorded in coded form, and the code must be recognized and interpreted by the data processing unit to which the data is subsequently transferred as the same is transcribed at high speeds from the magnetic tape. The operator or programmer of the data processing unit sets up the necessary controls within the data processing unit by means of a program which, in effect, instructs the data processing unit as to how to operate.

From the foregoing, it is seen that apparatus has been provided to enable the selective entry of data into the storage unit and the subsequent readout of data sequentially therefrom in groups. Further, it is seen that apparatus has been provided to economically facilitate the readout of data from a storage unit having a large number of data storage positions to a fewer number of output devices.

While the invention has been particularly shown and described with reference to a preferred embodiment thereof, it will be understood by those skilled in the art that various changes in form and details may be made therein without departing from the spirit and scope of the invention.

What is claimed is:

1. A device of the type described comprising a plurality of thyratrons each having a cathode, anode, control grid and shield grid, said control and shield grids being data inputs to the thyratrons which upon conduction store data in coded form, a clamped positive logical OR circuit connected to be driven by each of said thyratrons, an inverter follower bistable latch having on and off states A.C. coupled to said logical OR circuit, means for sequentially applying a predetermined potential to the anodes of said thyratrons at predetermined time intervals, means for sampling the output of said latch simultaneously with the application of the predetermined potential to the anodes of the thyratrons, and means for resetting the latch in a timed sequence so that the same is in the on state at the time that the predetermined potential is applied to the anodes of any of the thyratrons, whereby if the thyratron to which the predetermined potential is applied is conducting the latch remains in the on state and if said thyratron is extinguished the latch switches to the off state.

2. A device of the type described comprising a multiposition row counter having a single input and an output for each counter position means for advancing said row counter position by position at predetermined time intervals, a plurality of column sensing elements, a plurality of thyratrons each having a cathode, anode, control grid and shield grid, first circuit means connecting the outputs of said row counter to the control grids of said thyratrons so that the control grid of one thyratron is connected to one output of the row counter, second circuit means connecting the outputs of said plurality of column sensing elements to the shield grids of said thyratrons so that the shield grid of one thyratron is connected to the output of one column sensing element, a clamped positive logical OR circuit connected to be driven by each of said thyratrons, an inverter follower bistable latch having off and on states A.C. coupled to said logical OR circuit, a power source of a predetermined potential, a plurality of power amplifiers, means for selectively connecting said power amplifiers to said power source, third circuit means connecting the inputs of said power amplifiers to the outputs of said row counter, fourth circuit means connecting the outputs of said power amplifiers to the anodes of the thyratrons whereby if the power source is connected to the power amplifiers, the predetermined potential is sequentially applied to the anode of the thyratrons as the row counter advances position by position, means for time sampling the output of said latch simultaneously with advancement of said row counter at a predetermined time interval, and means for resetting the latch in a timed sequence so that the same is in the on state at the time that the predetermined potential is applied to the anodes of the thyratrons whereby if the thyratron to which the predetermined potential is applied is conducting the latch remains in the on state and if the thyratron is extinguished the latch switches to the off state.

3. A device of the type described according to claim 2 further comprising a second multiposition counter having a single input, a reset and an output from each counter position, said second counter upon stepping through a predetermined number of positions generates a carry, means for transmitting said carry of said second counter to the reset thereof, means for advancing said second counter position by position at predetermined time intervals, and means for transmitting said carry of said second counter to the input of said row counter whereby said row counter advances one position after said second counter advances through all of said predetermined positions.

4. A device of the type described according to claim 3 wherein the means for time sampling said latch includes a plurality of logical AND circuits each having a plurality of inputs, one input being connected to the output of said latch and the other of the inputs being connected to one of the outputs of said second counter.

5. In a device of the type described comprising a plurality of thyratrons each having a cathode, anode, control grid and shield grid, said thyratrons being arranged in rows and columns; a row counter having positions corresponding to the row positions of said thyratrons, said counter having a single input and an output for each counter position; means for advancing said row counter position by position at predetermined time intervals, first conductors commonly connecting the anodes of the thyratrons in a row of thyratrons for each rof of thyratrons, a power source of a predetermined potential level, a plurality of power amplifiers selectively connectable to said power source, means for selectively connecting said amplifiers to said power source, means for connecting the input of said power amplifiers to the outputs of said row counter, and means for connecting the outputs of said power amplifiers to said first conductors, whereby when said power amplifiers are connected to said power source while said first row counter is advanced position by position said predetermined potential level of said power source will be sequentially applied to the anodes of the thyratrons row by row.

6. A device of the type described comprising a plurality of thyratrons each having a cathode, anode, control grid and shield grid, said thyratrons being arranged in rows and columns, means for applying a signal to said shield grids of said thyratrons sequentially row by row, means for selectively applying a signal to said control grids of said thyratrons, first conductors commonly connecting the anodes of the thyratrons in a row of thyratrons for each row of thryatrons, means for sequentially applying a predetermined voltage level to said first conductors at predetermined time intervals, second conductors for commonly connecting the anodes of thyratrons in a column of thyratrons for each column of thyratrons, a diode connected to the anode of each thyratron in a column of thyratrons and to the second conductor for commonly connecting the anodes of the thyratrons in one of the columns, a bistable latch associated with each second conductor, means for A.C. coupling said latches to said second conductors, and means for sampling the outputs of said latches simultaneously with the sequential application of said predetermined voltage level to said first conductors.

7. A device of the type described according to claim 6 wherein said means for sequentially applying a predetermined voltage level to said first conductors comprises a first multiposition electronic counter having an input and a plurality of outputs, one output for each counter position; a power source of a predetermined potential level; a plurality of power amplifiers connected to said power source and having inputs connected to the outputs of said counter to be rendered operative thereby and outputs connected to said first conductors; and means for advancing said first counter position by position whereby said power amplifiers are rendered operative in sequence as said counter is advanced position by position.

8. A device of the type described according to claim 7 wherein said means for sampling the outputs of said latches comprises a second multiposition electronic counter having an input and a plurality of outputs, one output for each counter position, a plurality of logical AND circuits each having one input connected to the output of one of the latches and other inputs connected to the outputs of said second counter, and means for advancing said second counter in synchronism with the advancement of said first counter.

No references cited.